United States Patent
Stanglmaier et al.

(10) Patent No.: US 6,460,491 B1
(45) Date of Patent: Oct. 8, 2002

(54) METHOD OF WATER/FUEL CO-INJECTION FOR EMISSIONS CONTROL DURING TRANSIENT OPERATING CONDITIONS OF A DIESEL ENGINE

(75) Inventors: Rudolf H. Stanglmaier, San Antonio; Daniel W. Dickey, Helotes, both of TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 09/854,993

(22) Filed: May 11, 2001

(51) Int. Cl.$^7$ .............................................. F02B 47/00
(52) U.S. Cl. .................... 123/25 J; 123/25 E
(58) Field of Search ............................ 123/25 C, 25 E, 123/25 J

(56) References Cited

U.S. PATENT DOCUMENTS

| | | |
|---|---|---|
| 4,757,787 A | 7/1988 | Risitano et al. |
| 5,148,776 A | 9/1992 | Connor |
| 5,762,033 A | 6/1998 | Rembold et al. |

*Primary Examiner*—Noah P. Kamen
(74) *Attorney, Agent, or Firm*—Oliff & Berridge, PLC

(57) ABSTRACT

Engine operating parameters are monitored during each combustion cycle of a diesel engine, and changes in engine load demand are sensed. In response to sensing a change in engine load demand, an engine operating condition indicative of either a high smoke or a high NOx condition, or both, is determined, and water is co-injected with fuel during the transient period in which there is a high smoke or high NOx condition, or both. The co-injection of water and fuel is terminated when it is determined that there is no longer an engine operating condition during the transient period indicative of either a high smoke or a high NOx condition.

19 Claims, 5 Drawing Sheets

FUEL AND WATER INJECTION SCHEDULES DURING THE TRANSIENT CYCLE

EXHAUST NOx CONCENTRATION DURING TRANSIENT CYCLE FOR FUEL-ONLY AND FUEL + WATER STRATEGIES

METHOD OF WATER/FUEL CO-INJECTION FOR EMISSIONS CONTROL DURING TRANSIENT OPERATING CONDITIONS OF A DIESEL ENGINE

BACKGROUND OF THE INVENTION

1. Technical Field

This invention relates generally to a method for controlling emissions from a diesel engine, and more particularly to a method for controlling smoke and/or NOx emissions during engine transients.

2. Background Art

In-cylinder water injection has been previously used in diesel engines. The most common approach has involved the use of emulsified fuels, stored in a tank or mixed in-line, and water injection through a nozzle separate from the fuel injector. When using emulsified fuels, the water content cannot be altered quickly enough for transient control. When injected separately, the water injection amount can be varied quickly, but this method does not reduce smoke (soot) emissions appreciably.

Water injection has been used for reducing steady-state emissions from diesel engines, but it has previously not been possible to vary the composition of a water-based diesel mixture with sufficient speed to enable transient emissions control. For example, U.S. Pat. No. 5,762,033, titled INJECTION DEVICE FOR COMBINED INJECTION OF FUEL AND SUPPLEMENTARY FLUID OR LIQUID was issued Jun. 9, 1998, to Helmut Rembold and Walter Teegen. That patent describes an injection device for combined injection of a fuel and supplementary liquid into the combustion chamber. The Rembold, et al. patent specifically describes a spark-ignited internal combustion engine having a distributor that rotates synchronously with the engine to provide the injection timing for the water. The Rembold, et al. system is specifically directed to continuous co-injection of water and fuel in a spark-ignited engine, although in the second paragraph of the specification, Rembold, et al. states that their injection device may also be used in self-igniting internal combustion engines although no teaching of how this may be accomplished is presented.

When water is injected continuously during engine operation, as taught by Rembold, et al., a significant amount of water must be provided. In vehicular applications, the large quantity of water that must be carried on-board adds significant weight and space requirements to the vehicle.

The present invention is directed to overcoming the problems set forth above. It is desirable to have a system which only co-injects water with fuel when specifically needed to reduce NOx and smoke emissions, for example during engine transients. Moreover, by co-injecting water with fuel during engine transients, reduced air-to-fuel ratios can be used without excessive smoke emissions thereby allowing the engine torque rise rate to be improved. It is also desirable to have a water/fuel co-injection system in which the percentage of water in the mixture can be varied within a single combustion cycle.

SUMMARY OF THE INVENTION

In one aspect of the present invention, a method for reducing NOx and/or smoke emissions from a diesel engine during periods of transient changes in load demand include monitoring each combustion cycle of the engine during operation for a sensed value of at least one engine operating parameter representative of engine operation during the monitored cycle. The method further includes sensing a change in engine load demand, and determining an engine operating condition resulting from the change in load demand indicative of a high smoke and/or NOx condition. Water is then co-injected through an injector in fluid communication with a combustion chamber of the engine in response to the determined high smoke and/or NOx condition. The co-injection of water and fuel is terminated when it is determined that there is no longer an engine operating condition resulting from the sensing of a change in load demand that is indicative of a high smoke and/or NOx condition.

Other features of the method for reducing NOx in smoke emissions from a diesel engine during periods of transient changes in load demand include the sensed engine parameters being at least one of exhaust gas recirculation rate, injection timing, and manifold air pressure. Other features include the change in engine load demand being a change in torque demand, rpm demand, or intake manifold air pressure.

Still other features of the method include establishing a table of engine operating conditions at which high smoke and/or high NOx are produced and comparing the sensed values of at least one engine operating condition representative of engine operation during the monitored cycle with the established table.

BRIEF DESCRIPTION OF THE DRAWINGS

A more complete understanding of the method and operation of the present invention may be had by reference to the following detailed description when taken in conjunction with the accompanying drawings, wherein.

DETAILED DESCRIPTION OF PRESENTLY PREFERRED

EXEMPLARY EMBODIMENTS

Figure 2:
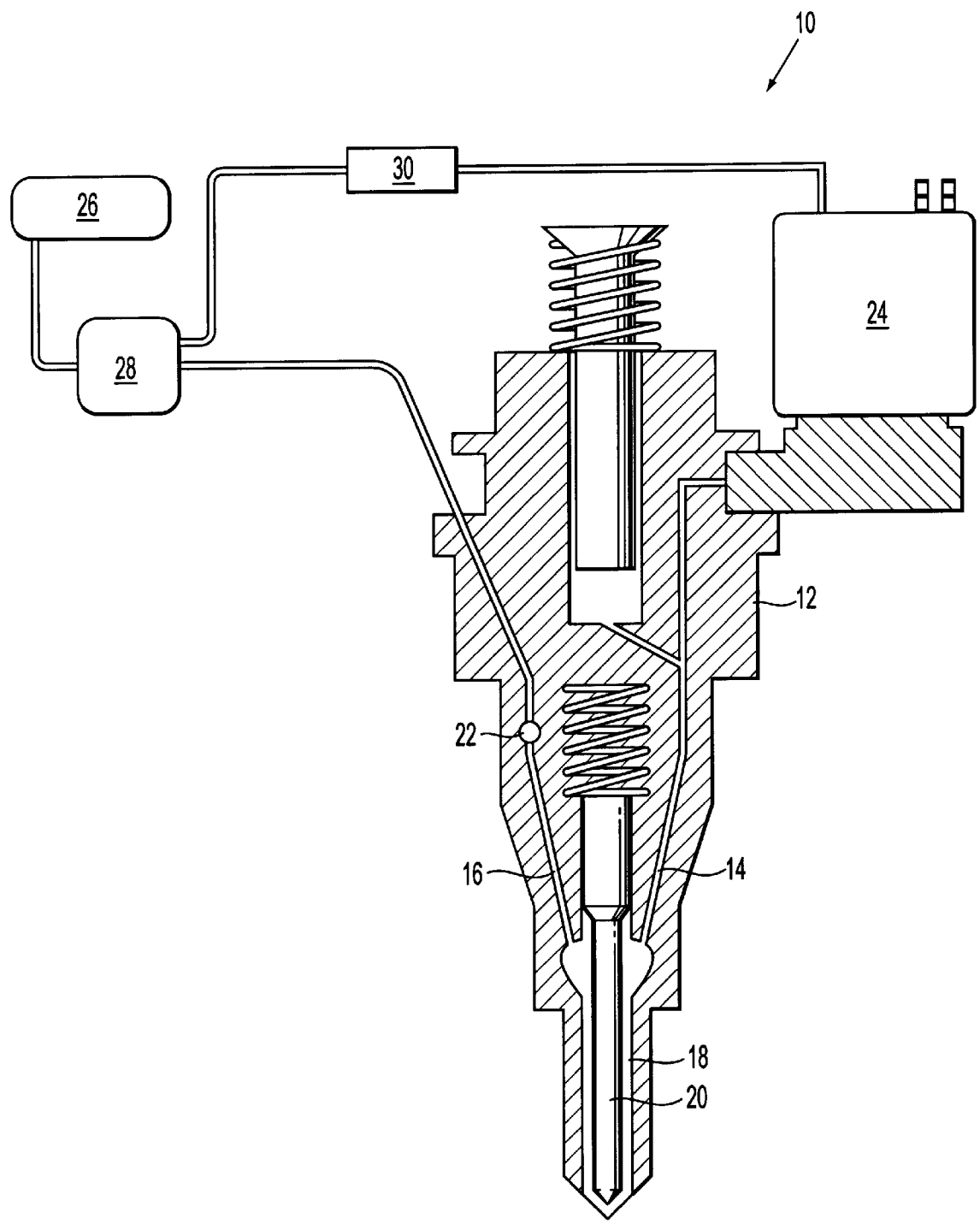
FIG. 2 is a somewhat schematic diagram of an injector adapted for selectively co-injecting water with fuel during engine transients in accordance with the present invention.

In the preferred embodiment of the present invention, a method of water/fuel coinjection for emissions control during transient operating conditions of the diesel engine is carried out by use of a suitable co-injector, such as the illustrative co-injector 10 shown in somewhat schematic fashion in FIG. 2. The co-injector 10 has a body 12 which has an internally disposed diesel fuel passage 14 and a water passage 16. Both passages 14, 16 terminate in an elongated annular chamber 18 which has a needle 20 disposed therein to seal the bottom of the elongated annular chamber 18 during periods in which fuel and/or a mixture of fuel and water injection is not desired. Desirably, the water passage 16 has a check valve 22 disposed therein to prevent backflow of fuel into the water supply system. Pressurized fuel is supplied to the fuel passage 14 through a spill valve 24 that modulates the total fuel injection quantity. When desired, for controlling NOx and smoke emissions during engine transients, pressurized water is provided from a pressurized water manifold 26 by a control valve 28, such as a solenoid operated valve, to the water passage 16. The control valve 28 is normally closed, and opens for a controlled amount of time during each combustion cycle when the engine is operating under transient conditions that would produce either high smoke and/or NOx emissions. Both the water injection control valve 28 and the fuel spill valve 24 are controlled by a conventional electronic control unit (ECU) 30.

Figure 1:
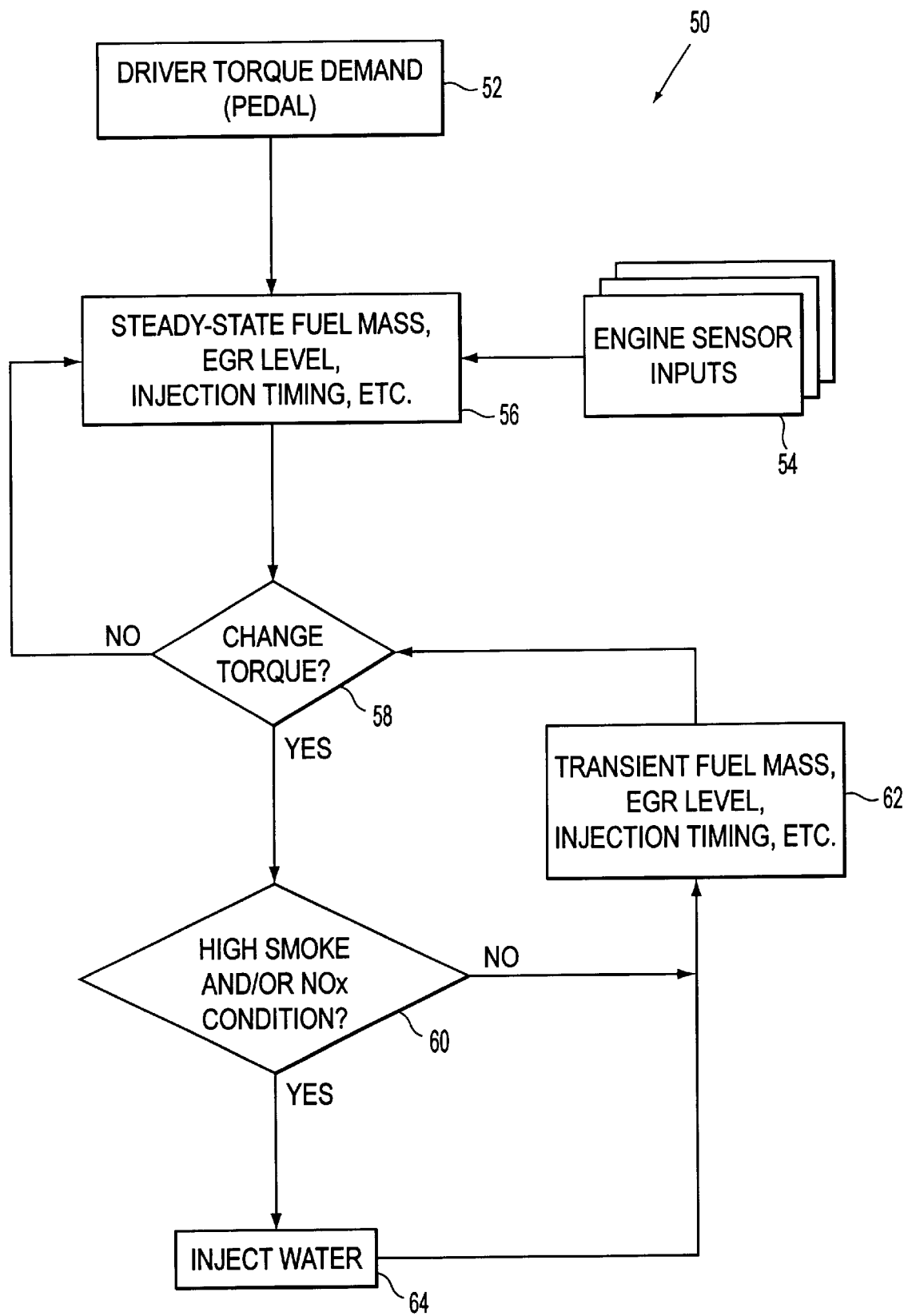
FIG. 1 is a flow diagram of the method for reducing NOx and smoke emissions from a diesel engine in accordance with the present invention.

Using either the specific system illustrated in FIG. 2, or a comparable arrangement which would carry out the same functions, the method 50 for selectively co-injecting water and fuel for emissions control during engine transient operating conditions in a diesel engine is illustrated in FIG. 1. Engine transients are defined as temporary oscillations that occur in an engine as a result of a sudden change in load. Such changes in vehicular engines are generally governed by changes in the fuel pedal position. When changes in the operator controlled pedal position are made, engine speed, torque, and accordingly, engine load are changed, as indicated at Box 52. Transients also occur in stationary engines as a result in changes in applied load and/or engine rpm. During each combustion cycle of the engine, various engine parameters such as fuel mass flow rate, exhaust gas recirculation rate, injection timing, and manifold air pressure, are sensed as indicated at Box 54. The sensed engine operating parameters are compared to the demanded torque, rpm, or load as indicated at Box 56, and if a change in the sensed values is demanded, as indicated at Box 58, a determination is made as to whether the demanded change in load, torque, rpm, etc. is indicative of either a high smoke condition, a high NOx condition, or both, as indicated at Box 60. If there is no demanded change in torque, the decision loop returns to Box 56 whereat the steady state fuel mass EGR level, injection timing, and other parameters are compared with the sensed parameter inputs.

Using either the specific system illustrated in FIG. 2, or a comparable arrangement which would carry out the same functions, the method 50 for selectively co-injecting water and fuel for emissions control during engine transient operating conditions in a diesel engine is illustrated in FIG. 1. Engine transients are defined as temporary oscillations that occur in an engine as a result of a sudden change in load. Such changes in vehicular engines are generally governed by changes in the fuel pedal position. When changes in the operator controlled pedal position are made, engine speed, torque, and accordingly, engine load are changed, as indicated at Box 52. Transients also occur in stationary engines as a result in changes in applied load and/or engine rpm. During each combustion cycle of the engine, various engine parameters such as fuel mass flow rate, exhaust gas recirculation rate, injection timing, and manifold air pressure, are sensed as indicated at Box 54. The sensed engine operating parameters are compared to the demanded torque, rpm, or load as indicated at Box 56, and if a change in the sensed values is demanded, as indicated at Box 58, a determination is made as to whether the demanded change in load, torque, rpm, etc. is indicative of either a high smoke condition, a high NOx condition, or both, as indicated at Box 60. If there is no demanded change in torque, the decision loop returns to Box 56 where the steady state fuel mass EGR level, injection timing, and other parameters are compared with the sensed parameter inputs.

With reference to FIG. 2, the actual amount of water injected, as a percent of fuel, will be determined by the ECU 30, based upon the specific sensed engine operating parameters at that patricular instant. It has been found that the amount of water injection with respect to the combined water and fuel co-injection, may range from about 10% to as much as 80%.

Figure 3:
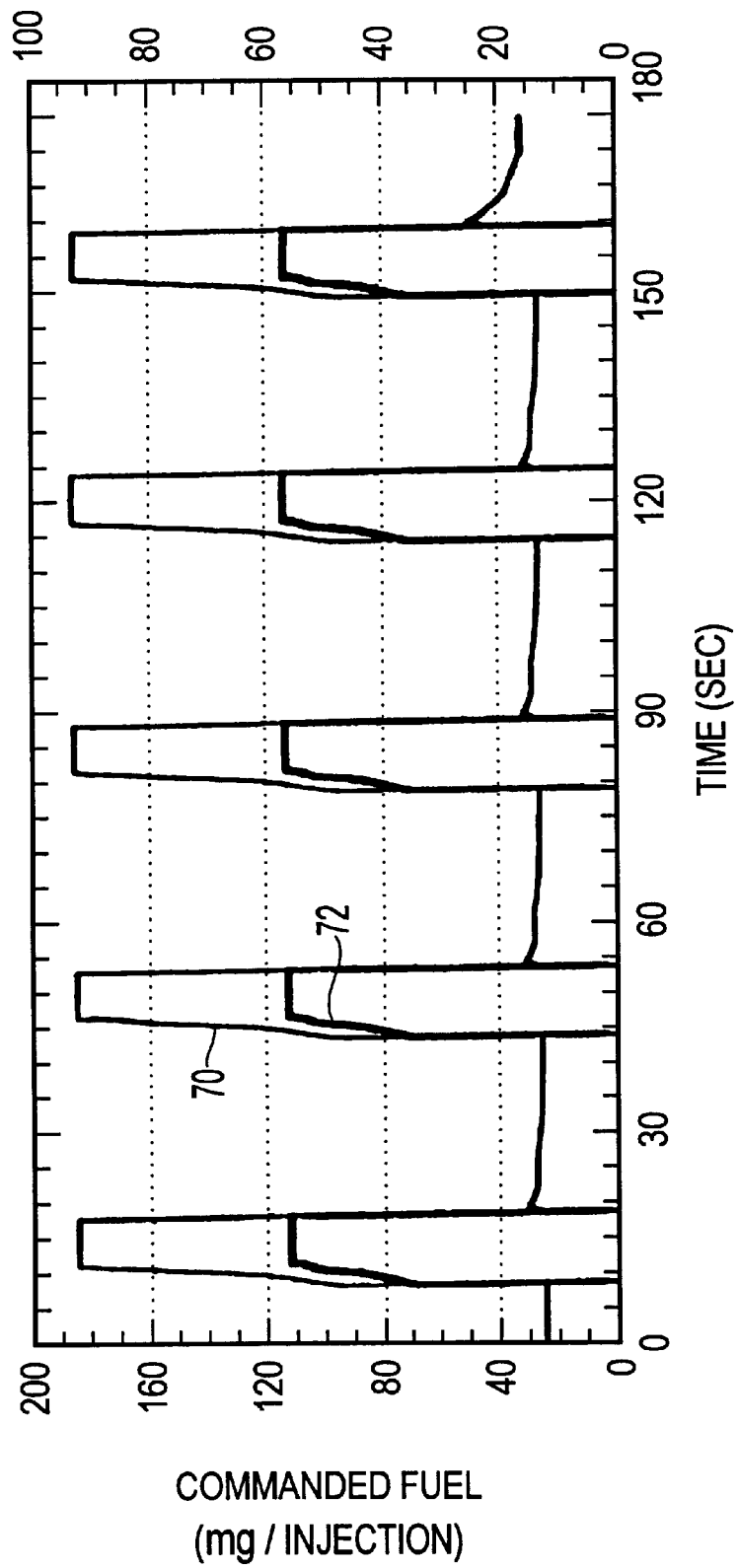
FIG. 3 is a graph illustrating actual fuel and water injection schedules during successive transient cycles in an illustrative example of the present invention.
Figure 4:
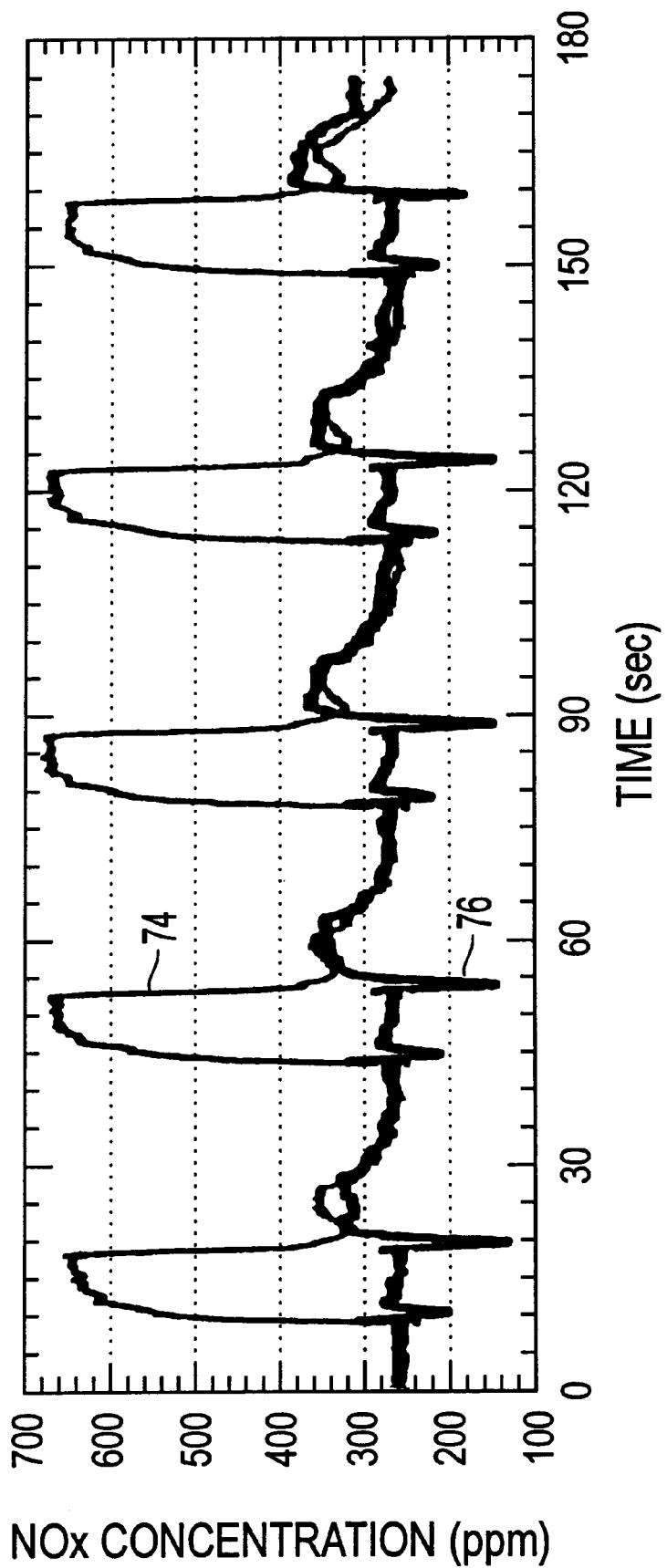
FIG. 4 is a graph illustrating the measured exhaust NOx concentration during the transient cycles illustrated in FIG. 3, for fuel-only and fuel+water injection schedules.
Figure 5:
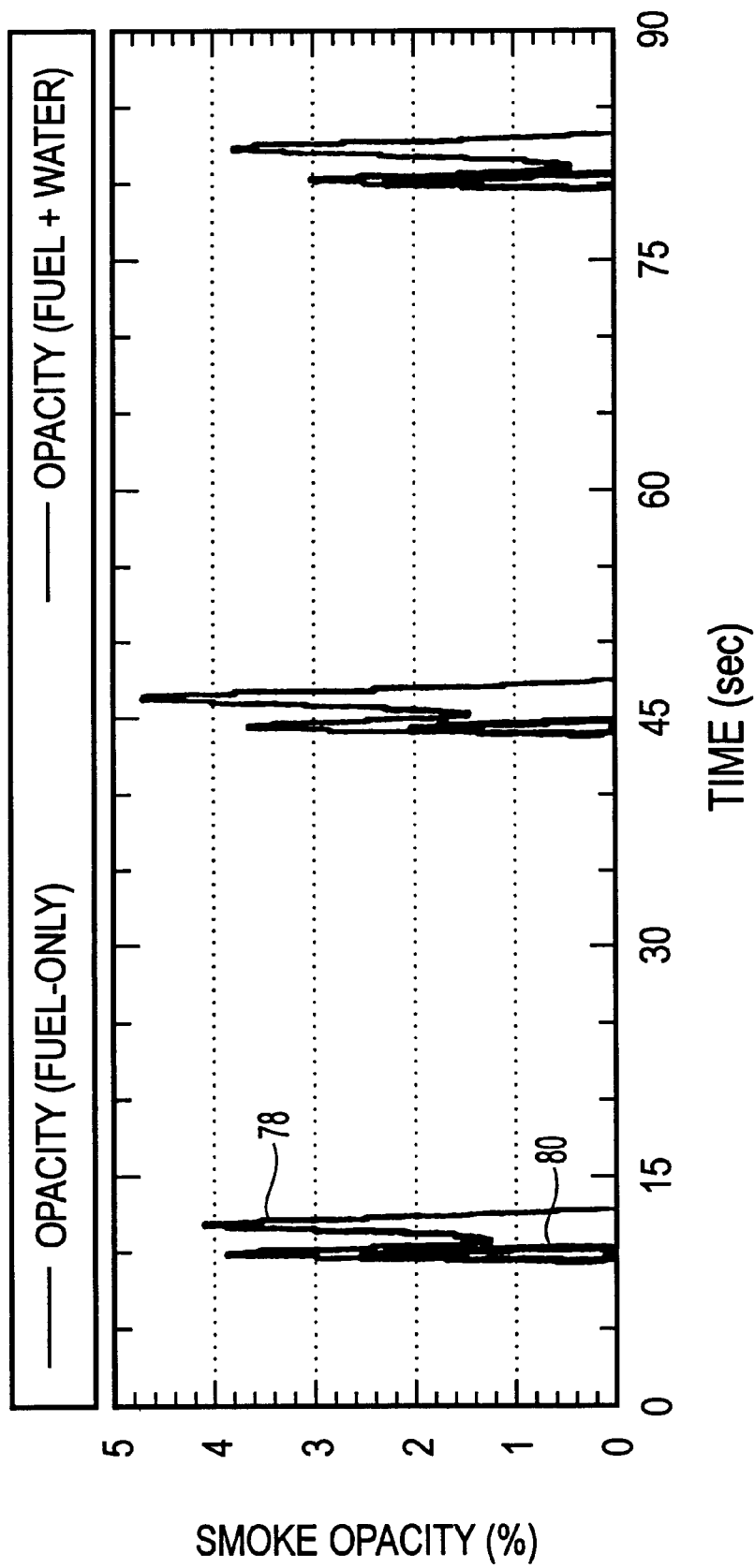
FIG. 5 is a graphical representation of measured smoke opacity during three transient cycles for fuel-only and fuel+water strategies.

In an illustrative embodiment of the method 50 for reducing NOx in smoke emissions from a diesel engine during periods of transient changes in load demand, specific transient schedules and resultant NOx and smoke quantities produced are illustrated in FIGS. 3–5. The transient engine tests were conducted in back-to-back cycles when the engine was first operated on a fuel-only basis and subsequently on fuel and water co-injection, as embodied by the present invention. The torque output, torque rise, and air/fuel ratio were kept as constant as possible between both tests. FIG. 3 shows the commanded fuel and water injection amounts for the back-to-back test cycles. Each transient cycle begins with a rapid increase in torque demand from an idle condition to full throttle. The engine was maintained at full throttle for about 10 seconds, at which the torque demand was terminated and the engine returned to an idle condition. The idle condition was maintained for about 25 seconds before the implementation of the next increase in torque demand between idle and full throttle positions. In FIG. 3, five such cycles are illustrated. The commanded fuel, in mg/injection, is represented by the line 70 and the commanded water, also in mg/injection, is represented by the darker line 72. The back-to-back tests were conducted with no EGR exhaust gas recirculation and TDC injection timing. The commanded fuel amounts followed a smoke-limiting algorithm controlled by sensed manifold air pressure. Note that the commanded water percentage is high early in the transient, but reaches a lower, constant percentage at full torque. At full torque, water constituted about 23% of the total co-injected fuel and water. There were no significant changes in measured torque between the fuel only and fuel plus water injection schedules.

The exhaust NOx concentration during the transients is shown in FIG. 4. The NOx concentration during the fuel only operating cycles is represented by line 74, and during the co-injection of water and fuel, as illustrated by FIG. 3, is represented by line 76 in FIG. 4. The graph clearly illustrates that the co-injection of water with fuel can considerably decrease, or even eliminate, the NOx excursion caused by the transient that occurs when no water was added.

The corresponding smoke opacity for the same test is shown in FIG. 5. In FIG. 5, the smoke opacity for the fuel-only cycle is represented by line 78, and the smoke opacity for the fuel plus water back-to-back cycle is represented by the darker line 80. A slightly elongated time scale is used on this figure, as compared to FIGS. 3 and 4, to more clearly illustrate the difference in smoke opacity during the comparative cycles. The relative opacity traces provide a valid comparison between both cases. The laboratory-measured data shows that, in addition to the NOx reduction illustrated in FIG. 4, co-injection of water with fuel can produce a large reduction in smoke opacity, both in magnitude and length of time during engine transients. These tests dramatically illustrate that cycle-resolved water co-injection with fuel can be used to simultaneously improve the NOx and smoke emissions of heavy duty diesel engines during transient operating conditions.

Industrial Applicability

The method for reducing NOx and smoke emissions from a diesel engine during periods of transient changes is particularly applicable to vehicular applications in which changes in load demand may be frequent and extensive. In the above-described method, water co-injection is used specifically as a transient emissions control device, and not as a continuous method of controlling emissions. The limited use of water co-injection with fuel during only the transient conditions dramatically decreases the amount of water required to be carried on board. In the illustrated specific example, water injection was off during low-load engine operations, and enabled soon after the beginning of the up-transient to full load. Water injection remained active as long as the engine was at full load, but was then turned off soon after the beginning of the down-transient when it was determined that the high smoke and/or NOx condition no longer existed. Importantly, the co-injection of water and fuel during the transient did not adversely affect the torque output of the engine during the transient when compared with the fuel-only case.

Importantly, the method for reducing NOx and smoke emissions during engine transients allows reduced air-to-fuel ratios without excessive smoke emissions, thereby allowing the engine torque rise rate to be improved. Moreover, the method for reducing NOx and smoke emissions embodying the present invention responds much faster than exhaust gas recirculation actuators or turbochargers and can be used to control transient emissions from engines equipped with EGR, as well as non-EGR engines. It is believed that the method for reducing NOx and smoke emissions from a diesel engine, in accordance with the present invention, is possibly the most effective method for improving transient emissions from diesel engines available to date.

Although the present invention is described in terms of a preferred exemplary embodiment, with specific illustrative key system components, those skilled in the art will recognize that changes in the system by which water and fuel are delivered to the co-injector, and the suggested sensed engine parameters, may be made without departing from the spirit of the invention. Such changes are intended to fall within the scope of the following claims. Other aspects, features, and advantages of the present invention may be obtained from a study of this disclosure and the drawings, along with the appended claims.

What we claim is:

1. A method for reducing NOx and smoke emissions from a diesel engine during periods of transient changes in an engine load demand, wherein said engine has at least one combustion chamber and an injector in fluid communication with said combustion chamber, said injector injecting fuel into said combustion chamber and selectively injecting water with said fuel into said combustion chamber, said method comprising:

monitoring at least one engine operating parameter representative of an engine operation in a combustion cycle of the engine during operation of said engine;

detecting a change in the engine load demand;

determining an engine operating condition resulting from said detected change in the engine load demand that is indicative of at least one of a high smoke and a high NOx condition;

co-injecting water and fuel through said injector and into said combustion chamber in response to said determined at least one of a high smoke and a high NOx condition; and terminating said co-injection of water and fuel in response to determining an absence of the engine operating condition resulting from said detection in the change in engine load demand indicative of the at least one of a high smoke and a high NOx condition.

2. The method as set forth in claim 1, wherein said determining an engine operating condition resulting from said detected change in load demand indicative of the at least one of a high smoke and a high NOx condition includes monitoring each combustion cycle of the engine during operation of the engine for the at least one engine operating parameter selected from the group consisting of: a fuel mass flow rate, an exhaust gas recirculation rate, an injection timing and a manifold air pressure.

3. The method as set forth in claim 1, wherein said determining an engine operating condition resulting from said detected change in load demand indicative of the at least one of a high smoke and a high NOx condition comprises detecting the amount of the at least one of a high smoke and a high NOx condition in the exhaust gas discharged from said at least one combustion chamber.

4. The method as set forth in claim 1, wherein said determining an engine operating condition resulting from said detected change in load demand indicative of the at least one of a high smoke and a high NOx condition further comprises:

establishing a table of engine operating conditions at which at least one of a high smoke and a high NOx condition are produced and comparing said monitored values of said at least one engine operating parameter representative of the engine operating condition during the monitored cycle with said established table.

5. The method as set forth in claim 1, wherein said change in the engine load demand is a change in an operator pedal position.

6. The method as set forth in claim 1, wherein said change in the engine load demand is change in an engine torque demand.

7. The method as set forth in claim 1, wherein said change in the engine load demand is a change in an intake manifold air pressure.

8. A method for reducing NOx and smoke emissions from a diesel engine during periods of transient changes in an engine load demand, wherein the engine has at least one combustion chamber, an injector in fluid communication with the combustion chamber and a controller that controls an injection of fuel and water into the combustion chamber, the method comprising:

monitoring at least one engine operating parameter during a combustion cycle of the engine during operation;

detecting a change in the engine load demand;

determining a presence of an emission condition indicative of at least one of a high smoke and a high NOx condition resulting from the detected change in the engine load demand;

selectively co-injecting water and fuel during periods of transient changes through the injector in response to determining the presence of the emission condition; and terminating the co-injection of water and fuel in response to determining an absence of the emission condition.

9. The method as set forth in claim 8, wherein the at least one engine operating parameter is selected from the group consisting of: a fuel mass flow rate, an exhaust gas recirculation rate, an injection timing and a manifold air pressure.

10. The method as set forth in claim 8, wherein the emission condition is detected in the exhaust/gas discharged from the at least one combustion chamber.

11. The method as set forth in claim 8, wherein determining the engine operating condition further comprises:

provides a table of established emission conditions at which the at least one of a high smoke and a high NOx condition are produced and comparing the monitored at least one engine operating parameter with the established table to determine if the at least one of a high smoke and a high,NOx condition is present.

12. The method as set forth in claim 8, wherein the change in the engine load demand is a change in an operator pedal position.

13. The method as set forth in claim 8, wherein the change in the engine load demand is a change in an engine torque demand.

14. The method as set forth in claim 8, wherein the change in the engine load demand is a change in an intake manifold air pressure.

15. The method as set forth in claim 8, wherein the engine also includes a sensor for detecting at least one of a smoke opacity and a NOx content.

16. The method as set forth in claim 8, wherein the co-injected water is a predetermined percentage of water that is variable within a single combustion cycle.

17. The method as set forth in claim 16, wherein the predetermined percentage of water that is combined with fuel may range from about 10% to about 80%.

18. The method as set forth in claim 8, wherein the change in engine load demand is a change in an applied load.

19. The method as set forth in claim 8, wherein the change in engine load demand is a change in an engine rpm.

* * * * *

UNITED STATES PATENT AND TRADEMARK OFFICE
CERTIFICATE OF CORRECTION

PATENT NO. : 6,460,491 B1
DATED : October 8, 2002
INVENTOR(S) : Stanglmaier et al.

It is certified that error appears in the above-identified patent and that said Letters Patent is hereby corrected as shown below:

<u>Column 2,</u>
Line 13, please change "... reducing NOx in smoke" to -- ... reducing NOx and smoke --

Signed and Sealed this

Eleventh Day of March, 2003

JAMES E. ROGAN
*Director of the United States Patent and Trademark Office*